United States Patent
Liu et al.

(10) Patent No.: US 7,720,065 B2
(45) Date of Patent: May 18, 2010

(54) METHOD AND APPARATUS FOR BIASING OF NETWORK NODE PACKET PRIORITIZATION BASED ON PACKET CONTENT

(75) Inventors: Ping Liu, Simpsonville, SC (US); Scott Charles Evans, Burnt Hills, NY (US); Ishan Prabhath Weerakoon, Rockville, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 153 days.

(21) Appl. No.: 12/040,252

(22) Filed: Feb. 29, 2008

(65) Prior Publication Data

US 2009/0219937 A1   Sep. 3, 2009

(51) Int. Cl.
*H04L 12/26* (2006.01)
(52) U.S. Cl. .................................. 370/389; 370/229
(58) Field of Classification Search ................ None
See application file for complete search history.

(56) References Cited

U.S. PATENT DOCUMENTS

| | | | |
|---|---|---|---|
| 2006/0067213 A1 | 3/2006 | Evans et al. | |
| 2007/0002740 A1 | 1/2007 | Evans et al. | |
| 2007/0115848 A1 | 5/2007 | Chean et al. | |
| 2008/0123660 A1* | 5/2008 | Sammour et al. | 370/395.21 |
| 2008/0153453 A1* | 6/2008 | Bachmutsky | 455/404.1 |

OTHER PUBLICATIONS

Scott C. Evans, et al.; Adaptive Statistical QoS: Learning Parameters to Maximize End-to-End Network Good-put; GE Research and Lockheed Martin Integrated System Solutions 2006.

Scott C. Evans, et al.; Route Based QoS and the Biased Early Drop Algorithm (BED); GE Research and Lockheed Martin Integrated System Solutions; Proceedings of the 2nd Int'l Conf. on Quality of Service in Heterogeneous Wired/Wireless Networks; 2005 IEEE.

(Continued)

*Primary Examiner*—Ayaz R Sheikh
*Assistant Examiner*—Nicholas Sloms
(74) *Attorney, Agent, or Firm*—Matthew C. Loppnow; Prass LLP

(57) ABSTRACT

A method and apparatus for biasing of network node packet prioritization based on packet content. The method may include marking a packet of data from a data stream of packets. The packet can be marked with a packet type such that subsequent nodes determine the relative priority of the packet with respect to other packets from the same data stream based on the packet type marking. The marked packet can then be transmitted. According to a related corresponding embodiment, a method can include receiving a packet at a node in a network, the node including a plurality of packet queues including a higher priority queue and a lower priority queue. The relative priority of the packet can be determined relative to other packets from the same packet source and intended for the same destination, where the relative priority can be based on the contents of the packet. The relative priority may also be based on a marking of the packet. The packet can be assigned to a higher priority queue based on a higher relative priority of the packet. The assigned packet can then be transmitted.

20 Claims, 7 Drawing Sheets

OTHER PUBLICATIONS

Chlamtac, I., Conti, M, Liu, J.; "Mobile Ad Hoc Networking: Imperatives and Challenges", Ad Hoc Networks I (2003) I3-64.

Firoiu, V., Boudec, J. L., Towsley, D. and Zhang, Z.; "Theories and Models for Internet Quality of Service", Procedings of IEEE, vol. 90, No. 9, Sep. 2002.

Li, C. and Knightly, E.; "Coordinated Multihop Scheduling: A Frame Work for End-to-End Services," IEEE/ACM Trans Net, vol. 10, No. 6, Dec. 2002.

Manish Mahajan, Manish Parashar; "Managing QoS for Multimedia Applications in the Differentiated Services Environment", Journal of Network and Systems Management, vol. 11, No. 4 (Dec. 2003), pp. 469-498.

Liu, P., Evans, S., and I. Weerakoon; "Modeling and Simulation of End-to-End QoS through Distress Biased Differentiated Services in OPNET", Opnetworks 2005.

J. Boyce and R. Gaglianello; "Packet Loss Effects on MPEG Video Sent Over the Public Internet," in Proc. of ACM Multimedia, pp. 181-190, Sep. 1998.

Nichols, et al.; Definition of the Differentiated Services Field (DS Field) in the IPv4 and IPv6 Headers, Standards Track, Dec. 1998 http://www.ietf.org/rfc/rfc2474.txt.

D. Clark and W. Fang; "Explicit Allocation of Best Effort Packet Delivery Service," IEEE/ACM Transaction on Networking, vol. 6, No. 4, Aug. 1998.

* cited by examiner

METHOD AND APPARATUS FOR BIASING OF NETWORK NODE PACKET PRIORITIZATION BASED ON PACKET CONTENT

BACKGROUND

1. Field

The present disclosure is directed to a method and apparatus for network traffic control. More particularly, the present disclosure is directed to biasing of network node packet prioritization based on packet content.

2. Introduction

Presently, information can be sent from a source to a destination over the Internet by breaking data into packets. These packets often travel through multiple intermediate nodes before being reassembled at the destination where the exact path from source to destination may vary due to the amount of network traffic and other factors. Unfortunately, some packets may encounter excessive delays if traffic is heavy at an intermediate node. As a result of these delays, some packets may arrive too late at a destination or may even be dropped at a node before reaching the destination. This can be especially problematic for multimedia applications which have stringent requirements on time bounded parameters. For example, Internet phones that use Voice over Internet Protocol (VoIP) can be especially sensitive to extensive packet delays, which can result in poor communication over such a phone when packets are excessively delayed. Video services are also sensitive to extensive packet delays, which can cause distorted or unintelligible video when packets are excessively delayed or dropped.

As a further example, providing end to end Quality of Service (QoS) is a key challenge for today's tactical networks, particularly for supporting multimedia applications due to their stringent requirements on time bounded parameters such as delay, jitter, and other parameters. Such multimedia applications have diverse requirements on network services. In the existing Differentiated Services (DiffServ) framework, applications, such as video applications, at edge nodes can estimate network congestion and try to adapt to the congestion level by adjusting transmission rates. Also, sophisticated video compression schemes, such as ITU-T H.263, H.264 and ISO/IEC MPEG-4, extensively utilize data dependency of video signals, which can result in packets with contents of unequal importance. However, network nodes do not know the relative importance of the packet to the application. As a result, important packets are dropped and delayed as much as packets of lesser importance.

Thus, there is a need for a method and apparatus for biasing of network node packet prioritization based on packet content.

SUMMARY

A method and apparatus for biasing of network node packet prioritization based on packet content. The method may include marking a packet of data from a data stream of packets. The packet can be marked with a packet type such that subsequent nodes determine the relative priority of the packet with respect to other packets from the same data stream based on the packet type marking. The marked packet can then be transmitted. According to a related corresponding embodiment, a method can include receiving a packet at a node in a network, the node including a plurality of packet queues including a higher priority queue and a lower priority queue. The relative priority of the packet can be determined relative to other packets from the same packet source and intended for the same destination, where the relative priority can be based on the contents of the packet. The relative priority may also be based on a marking of the packet. The packet can be assigned to a higher priority queue based on a higher relative priority of the packet. The assigned packet can then be transmitted.

BRIEF DESCRIPTION OF THE DRAWINGS

In order to describe the manner in which advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
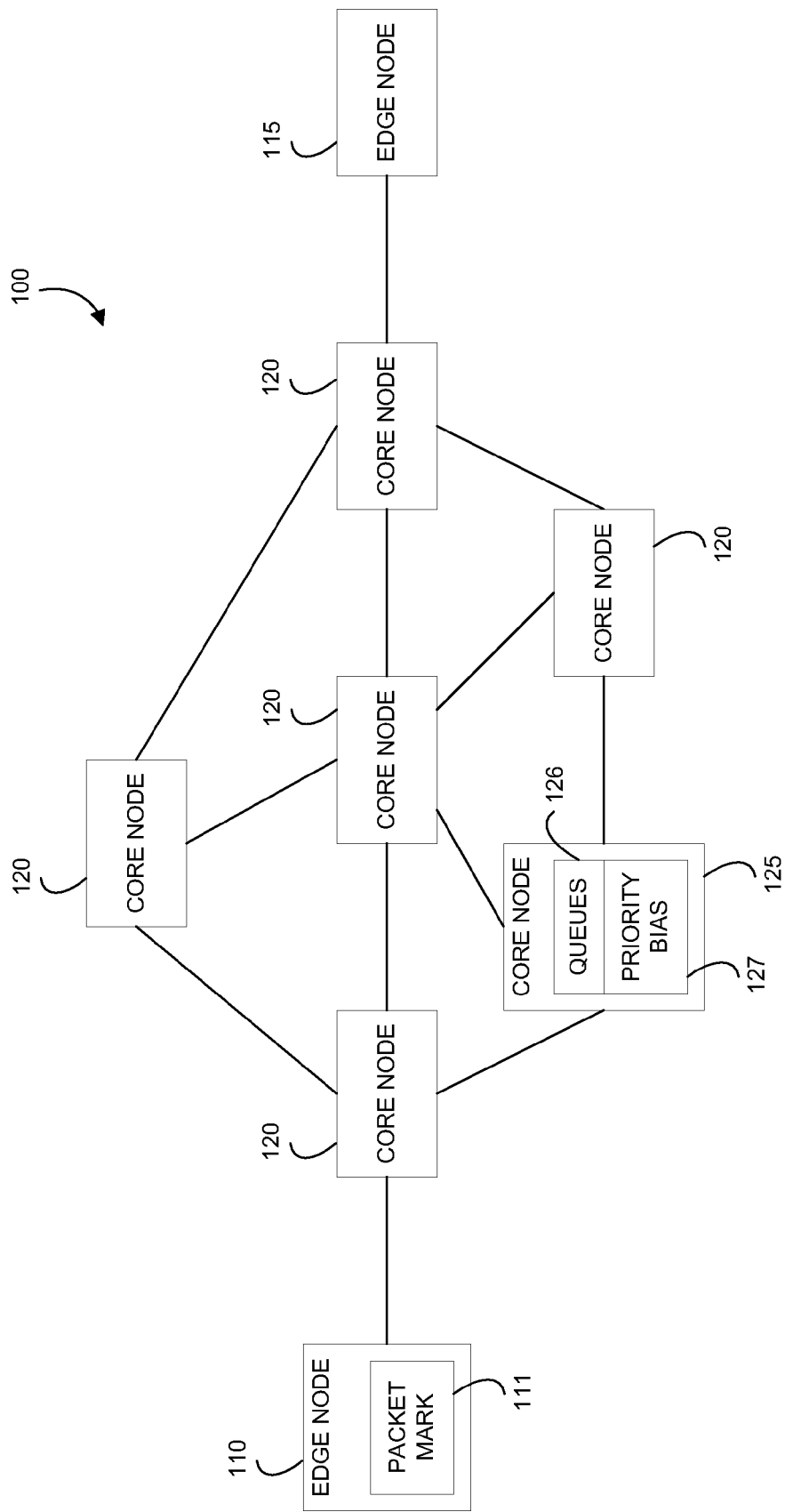
FIG. 1 illustrates an exemplary block diagram of a system in accordance with one embodiment.

FIG. 1 is an exemplary block diagram of a system 100 according to one embodiment. The system 100 can be a network including edge nodes 110 and 115 and core nodes 120 and 125. An edge node and a core node may be colocated. The system 100 can communicate packets of information among the nodes. For example, an edge node 110, such as a source node, as well as other nodes can produce packets which are destined for other nodes, such as destination edge nodes. The packets of information which are transmitted over the network may carry data, Voice over Internet Protocol (VoIP), streaming audio, video information, such as Moving Picture Experts Group (MPEG) video, and other information.

When a packet of data is produced by the edge node 100, it can carry an address tag identifying the destination node, such as edge node 115. A packet leaving the edge node 110 can traverse a path routed by the nodes 120. Each successive node can move the packet toward the destination node 115. Each movement of a packet from one node to the next node can be termed a hop.

The delay which a packet experiences in traversing the system 100 depends upon the number of nodes traversed, and upon the delay at each node. Some types of packets can tolerate substantial delays in transit and packets with time sensitive information, such as VoIP, video, and other time-based information may be more sensitive to excessive delay. Packets can be tagged with a priority or schedule which can indicate the relative importance of expeditious arrival of the packet at its destination node. Also, packets can have an associated time tag that indicates the last permissible time of arrival at the ultimate destination node.

In operation according to one embodiment, the edge node 110 can include a packet mark module 111 that can mark a packet of data from a data stream of packets. The packet can be marked with a packet type such that subsequent nodes can determine the relative priority of the packet with respect to other packets from the same data stream based on the packet type marking. The edge node 110 can then transmit the marked packet.

According to an interchangeable related embodiment, a core node 125 can receive a packet. Each node 120 in the system 100 may include similar features to the core node 125. The core node 125 can include a plurality of packet queues 126 including a higher priority queue and a lower priority queue. The core node 125 can also include a priority bias module 127 that can determine a relative priority of the packet relative to other packets from the same packet source and intended for the same destination. The relative priority can be based on the contents of the packet. The relative priority based on the contents can be determined by examining the packet contents, by examining information relative to the packet contents, by examining a portion of the packet contents, by examining a marking of the packet, or by any other useful technique for determining the priority of a packet relative to other packets from the same or other data streams. The core node 125 can then assign the packet to a higher priority queue based on a higher relative priority of the packet. The core node 125 can then transmit the packet to a subsequent core node 120 or to the destination edge node 115.

According to another interchangeable related embodiment, different packet types, such as video or VoIP packets, can be served differently in the core nodes 120 using an integration framework of a Quality of Service (QoS) aware application and content aware packet priority biasing protocol. In this framework, an application, such as a video application, can mark packet relative priorities according to various criteria. Then, a packet priority biasing algorithm can provide content aware service differentiation based on relative QoS requirements of each packet. This can dynamically adjust resource allocation to preserve important content in case of network congestion. Simulation results for video packets show that the integration framework can effectively maintain same end-to-end video quality, reduce overall network congestion, and improve Transmission Control Protocol (TCP) traffic throughput, which can result in more efficient usage of network resources.

For example, service differentiation can be provided in terms of service rate and loss probability associated with forwarding queues. Each flow of a user application can first request its preference by marking a DiffServ Code Point (DSCP) of a packet. The packet can then be classified, conditioned, and assigned, such as re-marked, to a certain network service level, considering the traffic profile at the boundary region, such as at an edge router. Each packet assigned to a queue class can be subject to a particular method of forwarding and/or reliability, such as a packet loss rate. This differentiation in queuing can be realized by core nodes in per-hop behavior, adopting multiple queues with several drop disciplines such as multiple random early detection (RED) or RED with In and Out bit (RIO), or Weighted Biased Early Drop (WBED) schemes.

Traditional DiffServ mechanisms can provide differentiated treatment for pre-determined classes of traffic flows. However, such mechanisms do not differentiate within an application, even though the data content importance could be drastically different. It can be desirable to have collaborative frameworks between the application and greedy per-hop forwarding mechanisms such as a packet priority biasing protocol.

The disclosed integrated framework can allow interaction between an application and a network. The relative importance of the packet and how packets are marked can be emphasized and hence differentiated in a DiffServ network. In this framework, an application can be QoS aware so that it can take advantage of unequal importance of packets, based on the content of the packet, by marking them with different importance levels, which can then be tied with proportional service differentiation in the DiffServ networks. Then, a packet priority biasing algorithm can integrate content awareness into a distress biased per-hop decision procedure. The relative differentiation concept can be a systematic way to achieve higher efficiency of a network.

According to another related example, multimedia applications can have very diverse requirements on the network services. DiffServ-aware applications can adapt to network congestion conditions by adjusting transmission rates. Moreover, sophisticated video compression schemes such as ITU-T H.263, H.264 and ISO/IEC MPEG-4 can extensively utilize kinds of data dependency of video signals resulting in packets of unequal importance. For example, in video encoding, an Intraframe-frame (I-frame) can be more important than a Predictive-frame (P-frame), and a P-frame can be more important than a Bi-directional-frame (B-frame). For such a video stream, a lost I-frame packet can lead to the content loss of subsequent packets as well as its own, which is caused by the spatial/temporal loss propagation as a result of inter-block/inter-frame correlation. For example, a 3% packet loss in the MPEG coded bit stream could translate into a 30% frame error rate. Hence, dropping frames in a certain preferred order, such as a B, P, I-frame order, can help reduce visual distortion. When it comes to content differentiation, precisely representing error propagation effect to the receiving video quality can be useful. Thus, a dynamic, low overhead algorithm can be useful for core nodes 120.

Two unused bits in a Differentiated Services (DS) field in addition to a Differentiated Services Codepoint (DSCP) can be used to indicate the relative importance by the application for core nodes 120. This can be called the "Relative Priority." For example, in a video stream, an I-frame packet type can be assigned the highest priority with a DS field value of 11, a P-frame can be next with a field value of 10, can a B-frame can have a lowest value of 01.

Figure 2:
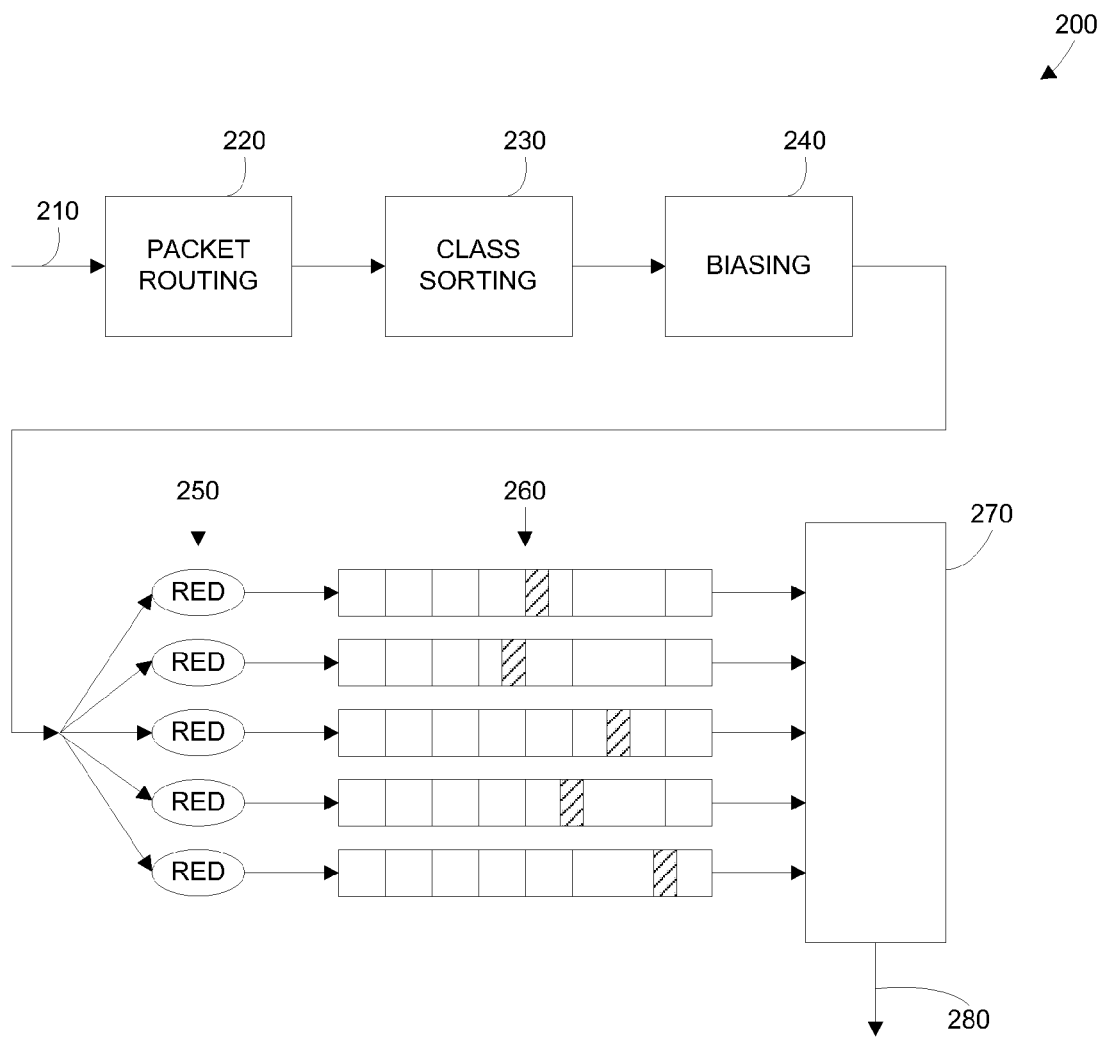
FIG. 2 illustrates a general structure of a node according to one embodiment.

FIG. 2 illustrates the general structure of a node 200, such as the node 120 according to one embodiment. The node 200 can include an input 210, a packet routing module 220, a class sorting module 230, a packet priority biasing module 240, Random Early Dropping (RED) blocks 250, queues 260, a queue servicing module 270, such as a weighted fair queue module, and an output 280. Each queue of the queues 260 can have a packet priority level relative to a packet priority level of other of the plurality of queues. In operation, the input 210 can receive a packet. The packet routing module 220 can perform routing selection for the packet. The packet priority bias module 240 can determine a relative priority of the packet relative to other packets from the same packet source that are intended for the same destination. The relative priority can be based on the contents of the packet. The packet priority bias module 240 can assign the packet to a higher priority queue based on a higher relative priority of the packet. The random early dropping modules 250 can randomly drop packets as its corresponding queue fills up. The queue servicing module 270 can access the plurality of queues to give priority to higher packet priority level queues.

The queue servicing module 270 can access a higher packet priority queue more often than a lower packet priority queue. The node 200 can output packets via the output 280.

The packet priority bias module 240 can determine the relative priority by examining the contents of the packet and determine the relative priority of the packet based on the contents and relative to other packets from the same packet source, where the other packets are intended for the same destination. For example, a packet can include encoded two bits remaining after a differentiated services code point in a differentiated services field of a packet header and the encoded two bits can identify the relative priority of the packet.

For example, according to an interchangeable related embodiment, DiffServ control can make packet decisions locally at each node 110, 115, 120, and 125 and the decisions may not require signaling among the nodes. Packets that are tagged with their destination address and with their priority relative to other packets can arrive at the packet routing block module 220, which may perform route selection, source routing, and packet label switching. The packets can then go to a class sorting module 230, where they can be sorted according to their priority or class. The packets can then be priority biased in priority bias module 240. The priority bias module 240 can priority bias the packets based on their relative priority as compared to packets from the same source and/or based on their relative priority to packets from other sources.

The packets can then be routed to the set of RED functions 250, and then to the set of queues 260. Each RED function 250 can randomly drop some packets as its associated queue fills up, to prevent overflow and consequent uncontrolled loss of packets. Each queue 260 can contain only packets of a given priority. Each queue can fill up to a greater or lesser degree, depending at least in part upon the number of high priority packets relative to the number of low priority packets. The queue servicing module 270 can access the queues 260 on a rotating basis. In general, in order to give priority to those queues containing higher-priority packets, the queue servicing module 270 may access a high-priority queue more often than from a low-priority queue. For example, the queue servicing module 270 may access a low-priority queue once for every two times it accesses higher-priority queue and may access medium-priority queue twice for each time it accesses lower-priority queue. Similarly, the queue servicing module 270 may access a highest-priority queue twice for every time it accesses a lower-priority queue and four times for each time it accesses a medium-priority queue. Many other ways can be used to service the queues so as to provide priority. Thus, the queue servicing module 270 can receive packets from the queue set 260 and send them from the node 200 by way of the output 280. Lower priority classes of service can have lower Quality of Service (QoS) and may be likely to have longer latency both at the individual node 200 and overall through the system 100.

Figure 3:
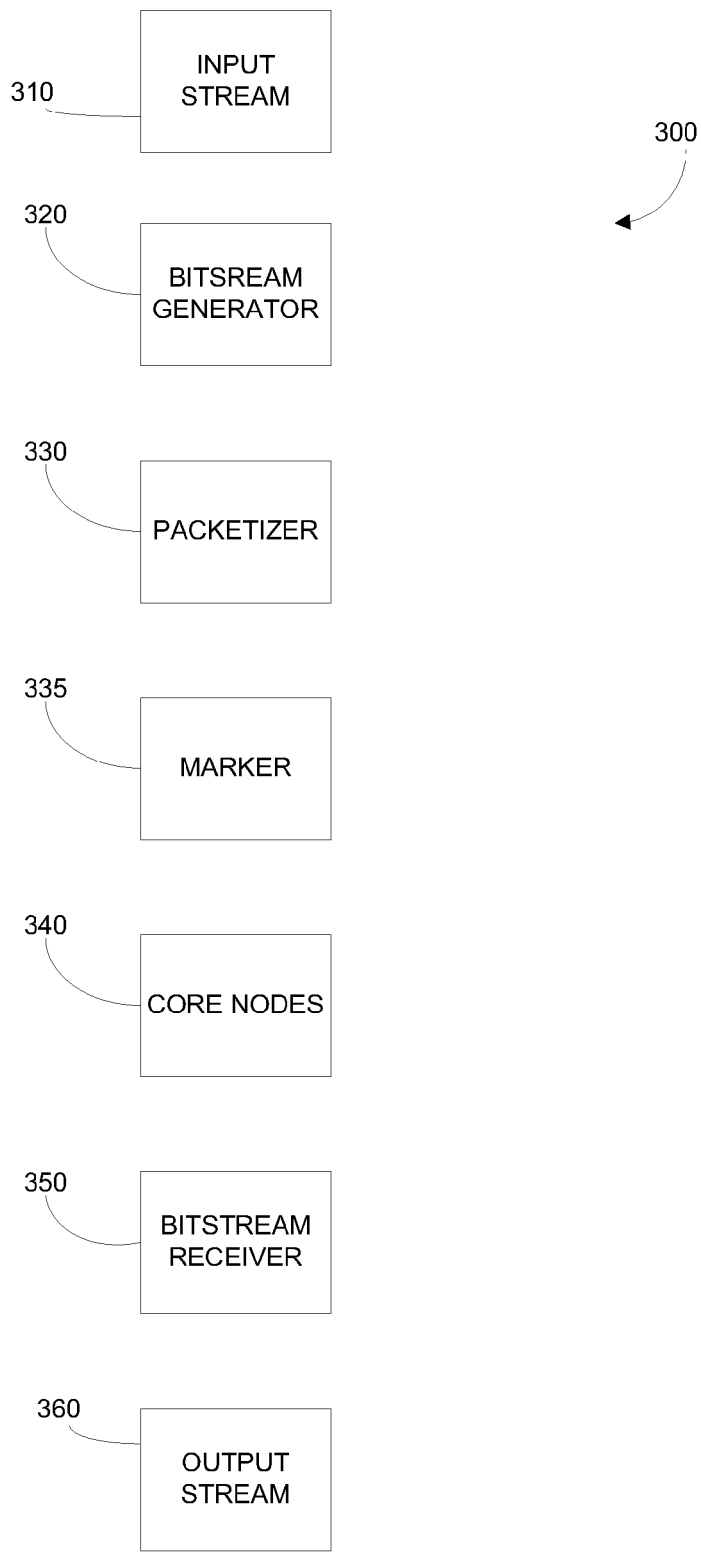
FIG. 3 is an exemplary block diagram illustrating the operation of a system according to one embodiment.

FIG. 3 is an exemplary block diagram 300 illustrating the operation of the system 100 according to another embodiment. In block 310, data is input into the system 100. In block 320, a bitstream generator can encode the data. In block 330, a packetizer can packetize the data. In block 335, a marker can mark the data with the relative priority. For example, the marker can mark the priority of one packet relative to the priority of other packets from the same source of data. The marker or another related block can also include data in the packet header that indicates the packet identifier, time data, size information, and other useful information. The packets can be marked such that queues at subsequent nodes 120 can be aware of content of the packets. Thus, content awareness can be integrated into a queue decision procedure at the nodes 120 based on relative priority. The content awareness can be integrated based on relative priority into a distress biased per-hop queue decision procedure. In block 340, the packet can travel through core nodes, such as nodes 120, on its way to its final destination, such as edge node 115. In block 350, a bitstream receiver can combine and decode the data from the packets. In block 360, the system 100 can output the data at the edge node 115.

For example, for video data, a raw video sequence in the YUV format can be passed to the bitstream generator 320, which can include a H.264 video encoder. YUV can indicate luma (Y) information and color information (U and V) where Y can stand for the luma component, such as the brightness and U and V can be the chrominance, such as color components. The bitstream generator 320 can generate and packetize the JPEG frames. Next, code can be added to mark the relative priority of the packets. According to one example, the priorities can be assigned according to the video frame type. After traversing the system 100, the packet frames received at the edge node 115 can be dumped to the H.264 decoder, which can decode the raw video sequence in YUV format again.

Figure 4:
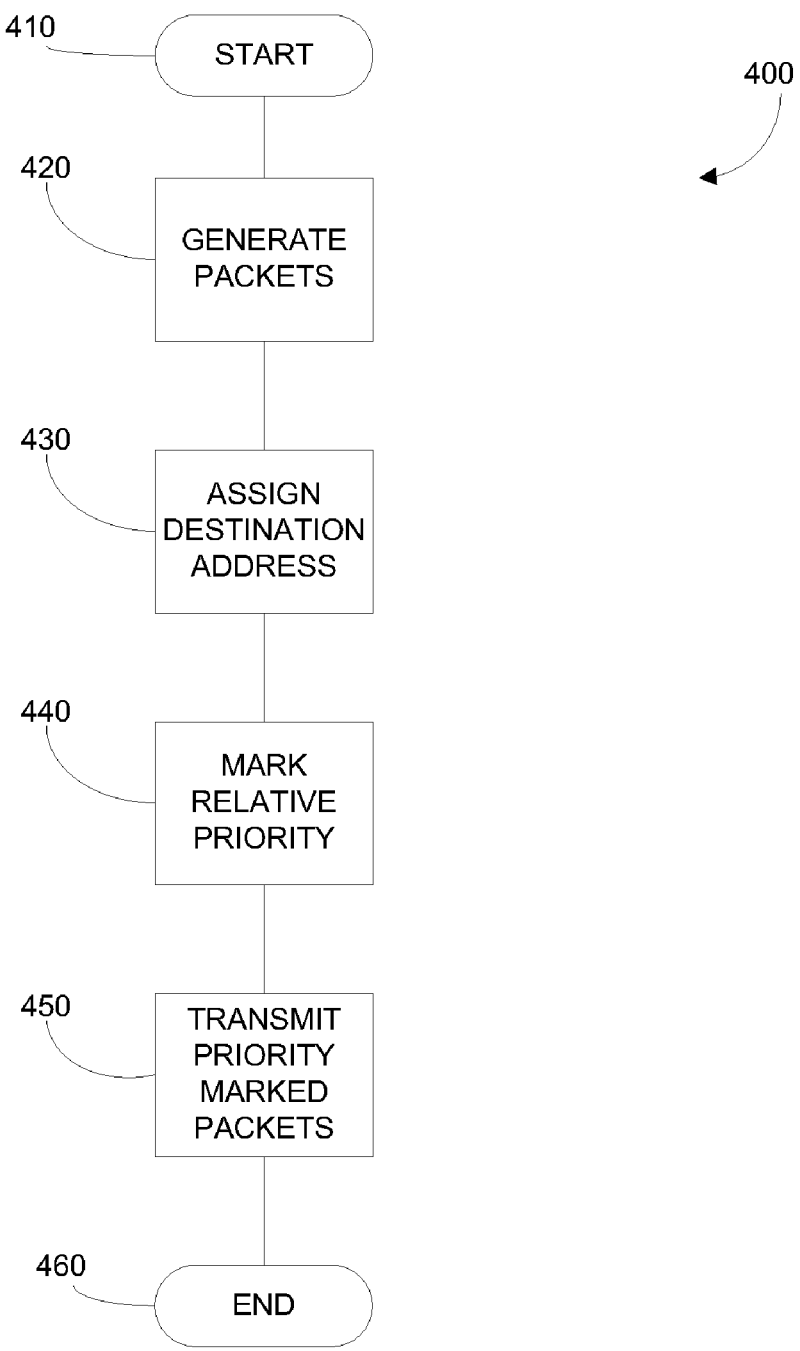
FIG. 4 is an exemplary flowchart illustrating the operation of a system according to another embodiment.

FIG. 4 is an exemplary flowchart 400 illustrating the operation of the system 100 according to another related and interchangeable embodiment. In step 410, the flowchart begins. In step 420, packets from a data stream from a source application can be generated at the edge node 110. The data stream may be a video data stream, a Voice over Internet Protocol (VoIP) data stream, an audio data stream, or any other data stream that can benefit from marking of packets in a data stream.

In step 430, a destination address can be assigned to each packet. In step 440, a packet of data can be marked. The relative priority of each of the packets can be marked at the source application to generate priority marked packets. The packet can be marked with a packet type such that subsequent nodes determine the relative priority of the packet with respect to other packets from the same data stream based on the packet type marking. For example, the packets can be marked to indicate the content of the packet. Marking can include encoding two bits remaining after a differentiated services code point in a differentiated services field of a packet header. Subsequent nodes 120 can determine the relative priority of a packet with respect to other packets from the same and other data streams based on the packet type marking. Safety factors can be employed at the nodes 120 to guard against demotion of priority traffic to lower queues. For example, a packet with stricter latency requirements can have a lower probability of being demoted than a packet with latency requirements that are less strict. Furthermore, multi-level security can be employed to decrypt packet header information such that a packet priority is discerned securely. For example, nodes 120 can determine the packet priority based on the packet contents using a first security level without being able to use a second security level to determine the actual packet payload.

As a further example, the data stream of packets can include at least two frame types including a first frame type and a second frame type, the first frame type not being compressed with respect to another frame and the second frame type being compressed with respect to another frame. The first frame type can be marked with a higher relative priority than the second frame type. As a more specific example, the data stream of packets can be a video data stream including an intraframe type, a predictive frame type, and a bi-directional frame type. The intraframe type can be marked with a higher relative priority than the predictive frame type and the bi-directional frame type. Thus, in MPEG encoding, P type packets and I type packets, which have different importance to the overall video quality, can be identified such that biasing can be used for packet dropping and promotion at core nodes in the system 100. In step 450, the marked packet can be transmitted from the edge node 110. In step 450, the flowchart 400 ends.

Figure 5:
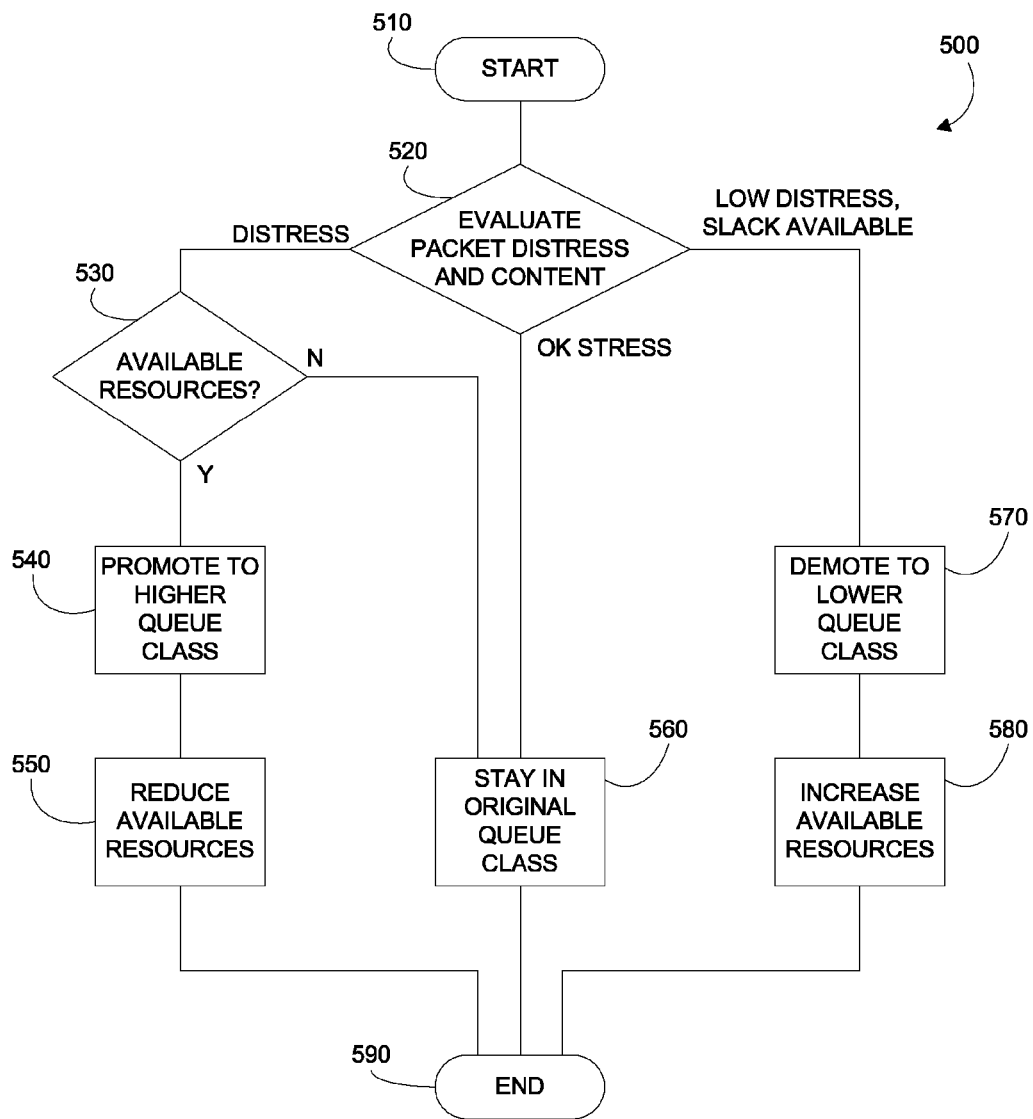
FIG. 5 is an exemplary flowchart illustrating the operation of a biasing module according to another embodiment.

FIG. 5 is an exemplary flowchart 500 illustrating the operation of the biasing module 240 according to another related embodiment. The flowchart 500 can illustrate a distress biased per-hop queue decision procedure that can include determining a packet's distress level. The term per-hop can reflect actions, behaviors or circumstances ascribed to each hop traversed, such as each node, of a multi-hop, such as a multi-node, packet journey through the system 100. If a packet is under distress, the packet can be promoted to a higher queue class if resources are available. Distress can indicate a risk a packet has of not meeting source to destination requirements, for example, end-to-end latency limits. If there is a low risk of a packet meeting its sourced to destination requirements, the packet is under acceptable distress. If a packet is under acceptable distress and slack is available, the packet can be demoted to a lower queue class and available resources can be increased. The slack can be determined by subtracting an elapsed latency of a packet and a remaining or predicted latency from an upper spec limit of allowed latency of a packet from a source to a destination. Packets with higher priority or increased importance can be more aggressively promoted when in distress and less likely to be demoted when in slack conditions. Promotion and demotion can refer to queueing the packet to a respective higher or lower priority queue than would normally occur. A high distressed packet of lesser importance may be dropped over a high distressed packet of high importance. Local information as well as information shared between one or more nodes can be used to determine levels of distress or slack. The information can include an average queue delay for a specific queue, an ideal queue delay of a packet expected once bandwidth, queue scheduling mechanism, and queue weight configuration are given, and/or an instantaneous queue delay. The queue delays can be combined and averaged. For example, a voice packet with a source to destination, such as end-to-end, latency requirement of 130 msec, which has accrued 100 msec of latency at the $3^{rd}$ of 5 hops is in more distress, or has less latency slack, than a packet that has accrued only 10 msec of latency in the $4^{th}$ of 5 hops.

In operation, in step 510, the flowchart begins. In step 520, the biasing module 240 can evaluate a packet's distress level and its content. If the packet is under distress, in step 530, the biasing module 240 can determine if there are available resources. If there are available resources, in step 540, the biasing module 240 can promote the packet to a higher queue class. Then, in step 550, the biasing module 240 can reduce an indicator of the available resources. If there are no available resources found in step 530 or if the packet is under acceptable stress in step 520, in step 560, the biasing module 240 can keep the packet in its original queue class. If in step 520, the biasing module 240 determines there is low or no distress and slack is available for the packet, in step 570, the biasing module 240 can demote the packet to a lower queue class. Then in step 580, the biasing module 240 can increase the available resources. In step 590, the flowchart can end.

Given the relative priorities of video packets, node Diff-Serv algorithms can take advantage of additional content information to implement proportional service differentiation. Packet distress level evaluation can be based on local information such as queue performance to decide whether to promote or demote packets along with the relative priority by using a weight parameter, $w_j$, to differentiate the packet types according to:

$$P = w_j * hops * \left( \frac{\lambda_{i_{avgDelay}} + \lambda_{i_{designedDelay}} + \lambda_{i_{instantDelay}}}{3} \right) * safetyFactor_j < MaxDelay$$

The weight parameter can bias the decision to promote or demote a packet between higher and lower priority queues at a node. The higher the weight $w_j$, the less likely a packet will be demoted and more likely it will be promoted and preserved. For example, packet types that are more important to video quality can be given higher weights. Sample weight assignments are shown in Table 1.

TABLE 1

Packet Type Weight Assignment

| Packet type | Weight |
|---|---|
| B-frame | 0.3 |
| P-frame | 0.6 |
| I-frame | 0.9 |

In the equation, hops can indicate remaining hop counts that a packet has to travel. The safetyFactor term can provide some margin to minimize the likelihood of a higher priority packet, or a packet with stricter latency requirements, to be demoted and fail its end to end QoS requirement. The $\lambda_{avgDelay}$ can be the average queue delay for a specific queue. The local average queue delay information can be used together with the designed queue delay to estimate the remaining delay across the remaining hops that the packet has to travel through. The $\lambda_{instantDelay}$ can be the instant queue delay for a specific queue, which can be measured and can be the current queue delay based on the instantaneous queue depth. The MaxDelay can be the maximum delay desired for a packet from source to destination. The $\lambda_{designedDelay}$ can be the ideal queue delay of a packet expected once the bandwidth, queue scheduling mechanism and queue weight configuration are given. This delay can be calculated based on $\overline{q}_i = s_i \overline{w}_i$ with parameters defined in Table 2 (where $w_i$ is a different term from $w_j$).

| Parameter | Definition |
|---|---|
| $\overline{q}_i$ | Mean number of packets from class i in buffer (packets) |
| $s_i$ | Throughput for class of traffic i (packets per second) |
| $\overline{w}_i = \dfrac{\overline{q}_i}{s_i}$ | Mean packet delay for class i (seconds) |

Figure 6:
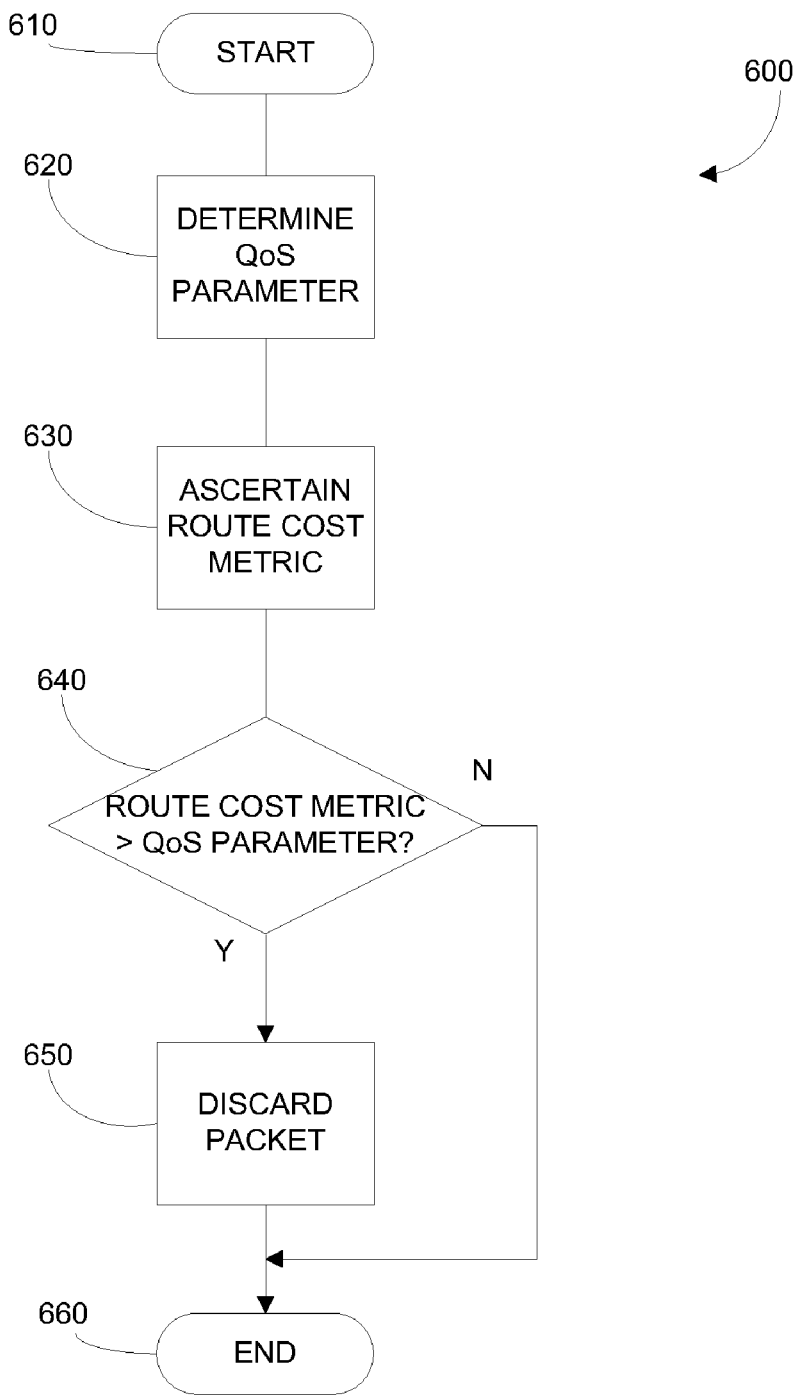
FIG. 6 is an exemplary flowchart illustrating the operation of a node according to another embodiment.

FIG. 6 is an exemplary flowchart 600 illustrating the operation of a node 120 according to another related and interchangeable embodiment. In step 610, the flowchart begins. In step 620, the node 120 can determine a quality of service parameter required for a packet. In step 630, the node 120 can ascertain a route cost metric for the packet. For example, a route cost metric may include a latency at each hop multiplied by the number of hops to a destination. In step 640, the node 120 can determine if the route cost metric is greater than a quality of service parameter. If the route cost metric exceeds the quality of service parameter, in step 650, the node 120 can discard the packet. In step 660, the flowchart 600 can end.

Figure 7:
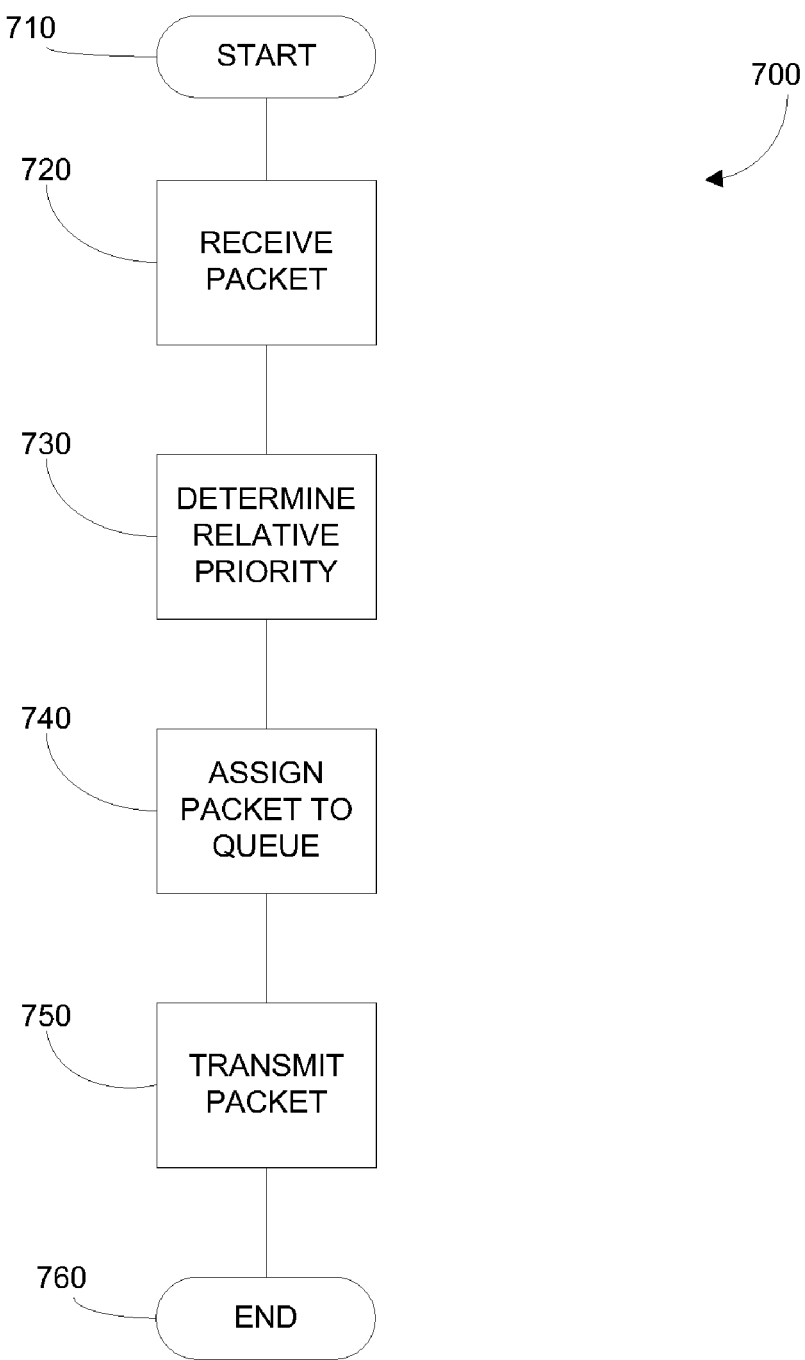
FIG. 7 is an exemplary flowchart illustrating the operation of a node according to another embodiment.

FIG. 7 is an exemplary flowchart 700 illustrating the operation of a node 120 according to another related and interchangeable embodiment. In step 710, the flowchart begins. In step 720, the node 120 can receive a packet. In step 730, the node 120 can determine a relative priority of the packet relative to other packets from the same packet source and intended for the same destination, where the relative priority can be based on the contents of the packet. For example, a decision of relative priority can be made based on priority or type of packet and also by checking a marking of the packet that indicates its relative importance or by looking at packet contents to determine its relative importance. As a further example, the relative priority can be determined by looking into the packet payload, such as its contents, to determine if it is an intraframe or predictive frame packet. For example, the relative priority can be determined by examining the contents of the packet and the relative priority of the packet can be determined based on the contents and relative to other packets from the same packet source, where the other packets are intended for the same destination. The packets can be treated on a per-hop basis according to what is known about it based on the type of information within the payload.

When determining the relative priority of the packet, the node 120 can also calculate a quality of service parameter required for the packet and ascertain a route cost metric, for example, latency to the destination, for the packet. The node 120 may then discard the packet if the route cost metric exceeds the quality of service parameter. The packet may include encoded two bits remaining after a differentiated services code point in a differentiated services field of a packet header and the encoded two bits can identify the relative priority of the packet. In step 740, the node 120 can assign the packet to a higher priority queue based on a higher relative priority of the packet.

When determining the relative priority of the packet in step 730, the node 120 can integrate content awareness based on relative priority into a distress biased per-hop queue decision procedure. The distress biased per-hop queue decision procedure can include determining a packet's distress level. If a packet is under distress, the node 120 can assign the packet to queue by promoting the packet to a higher queue class if resources are available. If the packet is under acceptable distress and slack is available, the node 120 can assign the packet to a queue by demoting the packet to a lower queue class and increasing available resources. In step 750, the node 120 can transmit the packet. In step 760, the flowchart 700 can end.

Thus, the present disclosure can provide an integration framework of a QoS aware application and a content aware packet priority biasing protocol so that different packets can be served differently in the core nodes. In one example of the framework, a video application can mark packet relative priorities. Then, a packet priority biasing protocol can provide content aware service differentiation based on the relative QoS requirement of each packet. This can dynamically adjust the resource allocation to preserve important content in case of network congestion. Experimental results have shown that the proposed integrated framework can effectively maintain the same end-to-end video quality, reduce overall network congestion and improve TCP traffic throughput, hence resulting in more efficient usage of a network.

Traditional DiffServ framework does not differentiate between packets within an application, even though the data content importance could be drastically different. In one example of the disclosed integrated framework, a video application can mark packet relative priorities, and by doing that, it can enable a core node 120 to differentiate the relative importance of the content and can provide content aware service differentiation based on the relative QoS requirement of each packet. This can dynamically adjust the resource allocation to preserve important content.

The content-aware framework can enable the integration of application specific QoS information such as relative importance of a packet to be leveraged in the core nodes' per hop behavior. Two unused bits in the DS field can be used to bridge between a DiffServ aware application and to enable the network to be content aware without much overhead and it can provide better end-to-end video quality by using the same network capacity. The framework can utilize the network bandwidth more efficiently. If a device that has this algorithm implemented is compared with a device that does not, the device with the algorithm can deliver better quality of service video or data to the end user.

For a video application, I-frame, P-frame and B-frame packets can be marked with different relative priorities. When the video flow starts to compete with other TCP flows, the content aware packet priority biasing protocol can start to dynamically promote/demote video packets and RED weighted bias early drop procedures can start dropping packets in the queue where a higher priority can result in smaller packet drop rate, which can enhance the performance as compared to a device than does not bias based on packet content. The content aware packet priority biasing protocol can also reduce the download time consistently while maintaining the same video quality as the video drop rate increases. Furthermore, when the network is congested, the newly augmented content aware packet priority biasing protocol can demote less important packets more aggressively to accommodate more important packets.

The method of this disclosure is preferably implemented on a programmed processor. However, the flowcharts and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method comprising:
    generating packets from a data stream at a source application;
    assigning a destination address to each packet of the packets from the data stream;
    marking a packet of data from the packets from the data stream, where the packet is marked with a packet type such that subsequent nodes determine the relative priority of the packet with respect to other packets from the same data stream based on the packet type marking; and
    transmitting the marked packet,
    wherein marking comprises marking a relative priority of each of the packets at the source application to generate priority marked packets such that subsequent nodes determine the relative priority of a packet with respect to other packets from the same data stream based on the packet marking, and
    wherein subsequent nodes determine the relative priority of the packet relative to other packets from the same packet source and intended for the same destination, where the relative priority is calculated using a packet distress level determined using an average of at least two delay factors multiplied by a safety factor, where the safety factor guards against demotion of priority traffic, where the average of at least two delay factors includes a queue delay for a specific queue, and where the average of at least two delay factors is also multiplied by a weight factor that is determined based on the packet marking, where the weight factor provides a bias for assigning a packet to a higher priority queue for higher priority packets relative to other packets from the same packet source.

2. The method according to claim 1, wherein marking comprises marking the packet of data from the data stream with the packet type such that subsequent nodes determine the relative priority of a packet with respect to other packets from the same and other data streams based on the packet type marking.

3. The method according to claim 1, further comprising integrating content awareness based on relative priority into a queue decision procedure.

4. The method according to claim 3,
    wherein integrating comprises integrating content awareness based on relative priority into a distress biased per-hop queue decision procedure,
    wherein the distress biased per-hop queue decision procedure comprises:
        determining a packet's distress level;
        if a packet is under distress, promoting the packet to a higher queue class if resources are available; and
        if a packet is under acceptable distress and slack is available, demoting the packet to a lower queue class and increasing available resources.

5. The method according to claim 4, wherein distress comprises a risk a packet has of not meeting source to destination requirements.

6. The method according to claim 4, wherein local information as well as information shared between one or more nodes is used to determine levels of distress or slack.

7. The method according to claim 1, further comprising:
    determining a quality of service parameter required for a packet received at a queue in a network;
    ascertaining a route cost metric for the packet; and
    discarding the packet if the route cost metric exceeds the required quality of service parameter.

8. The method according to claim 1,
    wherein marking further comprises encoding two bits remaining after a differentiated services code point in a differentiated services field of a packet header.

9. The method according to claim 1,
    wherein the data stream of packets comprises one of a voice over internet protocol data stream and a video data stream.

10. The method according to claim 1,
    wherein the data stream of packets comprises at least two frame types including a first frame type and a second frame type, the first frame type not being compressed with respect to another frame and the second frame type being compressed with respect to another frame, and
    wherein the first frame type is marked with a higher relative priority than the second frame type.

11. The method according to claim 1,
    wherein the data stream of packets comprises a video data stream including a intraframe type, a predictive frame type, and a bi-directional frame type, and
    wherein the intraframe type is marked with a higher relative priority than the predictive frame type and the bi-directional frame type.

12. The method according to claim 1, further comprising employing multilevel security to decrypt packet header information such that a packet priority is discerned securely.

13. A method comprising:
    receiving a packet at a node in a network, the node including a plurality of packet queues including a higher priority queue and a lower priority queue;
    determining a relative priority of the packet relative to other packets from the same packet source and intended for the same destination, where the relative priority is calculated using a packet distress level using an average of at least two delay factors multiplied by a safety factor, where the safety factor guards against demotion of priority traffic, where the average of at least two delay factors includes a queue delay for a specific queue, and where the average of at least two delay factors is also multiplied by a weight factor that is determined based on the contents of the packet, where the weight factor provides a bias for assigning a packet to a higher priority queue for higher priority packets relative to other packets from the same packet source;
    assigning the packet to a higher priority queue relative to other packets from the same packet source based on a higher relative priority of the packet; and
    transmitting the packet.

14. The method according to claim 13, further comprising:
    integrating content awareness based on relative priority into a distress biased per-hop queue decision procedure, wherein the distress biased per-hop queue decision procedure comprises:
   determining a packet's distress level;
   if the packet is under distress, assigning further comprises promoting the packet to a higher queue class if resources are available; and
   if the packet is under acceptable distress and slack is available, assigning further comprises demoting the packet to a lower queue class and increasing available resources.

15. The method according to claim 13, wherein the relative priority is determined by:
   examining the contents of the packet; and
   determining the relative priority of the packet based on the contents and relative to other packets from the same packet source, where the other packets are intended for the same destination.

16. The method according to claim 13,
   wherein the packet includes encoded two bits remaining after a differentiated services code point in a differentiated services field of a packet header, and
   wherein the encoded two bits identify the relative priority of the packet.

17. The method according to claim 13, further comprising:
   calculating a quality of service parameter required for the packet;
   ascertaining a route cost metric for the packet; and
   discarding the packet if the route cost metric exceeds the quality of service parameter.

18. An apparatus comprising:
   an input configured to receive a packet;
   a plurality of queues, each queue of the plurality of queues having a packet priority level relative to a packet priority level of other of the plurality of queues;
   a packet priority bias module configured to determine a relative priority of the packet relative to other packets from the same packet source that are intended for the same destination, where the relative priority is calculated using a packet distress level determined using an average of at least two delay factors multiplied by a safety factor, where the safety factor guards against demotion of priority traffic, where the average of at least two delay factors includes a queue delay for a specific queue, and where the average of at least two delay factors is also multiplied by a weight factor that is determined based on the contents of the packet, where the weight factor provides a bias for assigning a packet to a higher priority queue for higher priority packets relative to other packets from the same packet source and where the packet priority bias module is configured to assign the packet to a higher priority queue based on a higher relative priority of the packet; and
   a queue servicing module coupled to the plurality of queues, the queue servicing module configured to access the plurality of queues to give priority to higher packet priority level queues, where the queue servicing module is configured to access a higher packet priority queue more often than a lower packet priority queue.

19. The method according to claim 1, wherein the queue delay for a specific queue comprises at least one of an average queue delay for a specific queue and an instant queue delay for a specific queue.

20. The method according to claim 1, wherein the packet distress level is determined using an algorithm including at least:

$$P = w_j * hops * \left( \frac{\lambda_{i_{avgDelay}} + \lambda_{i_{designedDelay}} + \lambda_{i_{instantDelay}}}{3} \right) * safetyFactor_j$$

where P is the packet distress level, $w_j$ is the weight parameter, hops is a number of hops, $\lambda_{i_{avgDelay}}$ is an average queue delay for a specific queue, $\lambda_{i_{designedDelay}}$ is an ideal queue delay of a packet, $\lambda_{i_{instantDelay}}$ is an instant queue delay for a specific queue, and $safetyFactor_j$ is a safety factor that ensures a packet meets its end to end quality of service requirement.

* * * * *